(12) United States Patent
Kvisteroey et al.

(10) Patent No.: US 6,576,968 B2
(45) Date of Patent: Jun. 10, 2003

(54) SENSOR

(75) Inventors: Terje Kvisteroey, Horten (NO); Jacobsen Henrik, Horten (NO)

(73) Assignee: Sensonor ASA, Horten (NO)

( * ) Notice: Subject to any disclaimer, the term of this patent is extended or adjusted under 35 U.S.C. 154(b) by 0 days.

(21) Appl. No.: 09/855,113

(22) Filed: May 14, 2001

(65) Prior Publication Data
US 2002/0011637 A1 Jan. 31, 2002

(30) Foreign Application Priority Data
Jun. 16, 2000 (EP) ............................................. 00305111

(51) Int. Cl.[7] ................................................. H01L 29/82
(52) U.S. Cl. ........................ 257/417; 257/415; 257/416; 257/418; 257/419
(58) Field of Search ................................. 257/417, 415, 257/416, 418, 419; 73/708, 497, 702

(56) References Cited
U.S. PATENT DOCUMENTS

| 4,598,381 A | * | 7/1986 | Cucci ............................ 364/558 |
|---|---|---|---|
| 4,765,188 A | * | 8/1988 | Krechmery et al. ............ 73/708 |
| 5,060,526 A | * | 10/1991 | Barth et al. ................ 73/862.59 |
| 5,090,254 A | * | 2/1992 | Guckel et al. ............. 73/862.59 |
| 5,105,665 A | * | 4/1992 | Parsons et al. ................ 73/704 |
| 5,275,055 A | * | 1/1994 | Zook et al. .................... 73/778 |
| 5,417,115 A | * | 5/1995 | Burns ........................... 73/778 |
| 5,447,073 A | * | 9/1995 | Kalinoski ................. 73/861.24 |
| 5,458,000 A | * | 10/1995 | Burns et al. ................... 73/708 |

\* cited by examiner

*Primary Examiner*—Vu A. Le
*Assistant Examiner*—Doug Menz
(74) *Attorney, Agent, or Firm*—Boyle, Fredrickson, Newholm, Stein & Gratz, S.C.

(57) ABSTRACT

A sensor formed from a semiconductor material. The device comprises a support frame, a sensing element; and means for vibrating the sensing element at a frequency corresponding generally to a first resonant frequency vibration mode. Error detection means detects the resonant frequency vibration mode, the output of the error detection means being indicative of existence or otherwise an expected response of the resonant frequency vibration mode to the excitation. Means for detecting the deformation of the sensing element provides an output indicative of the parameter to be sensed, the deformation detecting means and error detection means being formed from the same elements.

10 Claims, 4 Drawing Sheets

SENSOR

This invention relates to a sensor, such as pressure and flow sensors, actuators accelerometers, etc and particularly to features of such devices to enable testing of their functionality.

In recent times there have been many advances in the development of micromachined devices for measuring different physical properties such as changes in acceleration, pressure and flow. Such devices are useful in many applications and are used widely in the aerospace and automotive industries, for example. Such devices use flexible parts such as mass spring systems in accelerometers, plates or diaphragms in pressure sensors or some kind of flexible spring elements in the more general case. For example, one approach to acceleration sensing in such application is to provide a device formed from a semiconductor material, the device having a mass formed from the semiconductor material and suspended with respect to the rest of the device. Changes in acceleration of the device can be detected by measuring the deformation of the device by movement of the mass piezoresistively, capacitively, electrostatically or thermally. Whilst such approaches are effective, problems can occur if the device becomes damages or in-effective in use. This is because it is difficult to distinguish between signals arising from external acceleration, from damage occurring external to the device, or lack of signal due to damage in-device whilst it is operating.

Another approach used in accelerometers is to excite a device at a resonant frequency. With such devices there is a detector on the device which allows for detection of the resonant frequency of the device, which is dependent upon external accelerative forces. Thus by investigating the resonant frequency one can find the external acceleration. Indirectly this can provide a continuous functionality-test, due to the continuous detection of the resonant frequency, but is costly to achieve because of the requirements for additional circuitry, etc.

The present invention seeks to provide a more cost effective device with both combination of functionality and the ability to provide test indicators (or self testing).

The present invention seeks to provide a micro machined device which is reliable and cost effective, but which can be tested regularly, or continuously, and whilst in use, to ensure proper functionality.

According to the present invention there is provided a sensor formed from a semiconductor material, the device comprising:

a support frame;

a sensing element;

means for vibrating the sensing element at a frequency corresponding generally to a first resonant frequency vibration mode;

error detection means for detecting the resonant frequency vibration mode, the output of the error detection means being indicative of the existence or otherwise of an expected response of the resonant frequency vibration mode to the excitation; and means for detecting the deformation of the sensing element to provide an output indicative of the parameter to be sensed, the deformation detecting means and error detection means being formed from the same elements, wherein the means or detecting the deformation are the same as the means for setting up vibrations and can electronically detect both the error detection signal as well as the sensing signal.

The sensing element may be a membrane, and the sensor may be a pressure sensor. The sensing element may be a mass or masses and support beam or beams, and the sensor may be an accelerometer.

The sensing element may be a spring. The vibrating means may be one or more resistive elements. The resonant frequency detection means may be one or more piezoresistors positioned on the device. The support and sensing element may be formed from a single semiconductor substrate. The semiconductor may be silicon.

Using piezoresistors/capacitors etc. deformation in the springs/mass, plate/diaphragm or some kind of spring elements due to external forces will be detected. The operating frequency band will be below the fundamental resonant (first) mode leading to simple separation of segments. Furthermore, as excitation at one of the resonant frequencies is performed, this resonant frequency will be detectable using piezoresistors, capacitive elements etc. The response generated from the device may thus exhibit two pieces of important information, namely information on functionality, that is, information on whether it is working properly, and external acceleration, pressure, flow, etc. The self test of the device of the invention has the advantage that it can be performed during use of the accelerometer, either continuously or at regular intervals to reduce power consumption.

Examples of the present invention will now be described with reference to the accompanying drawings, in which.

Figure 1A:
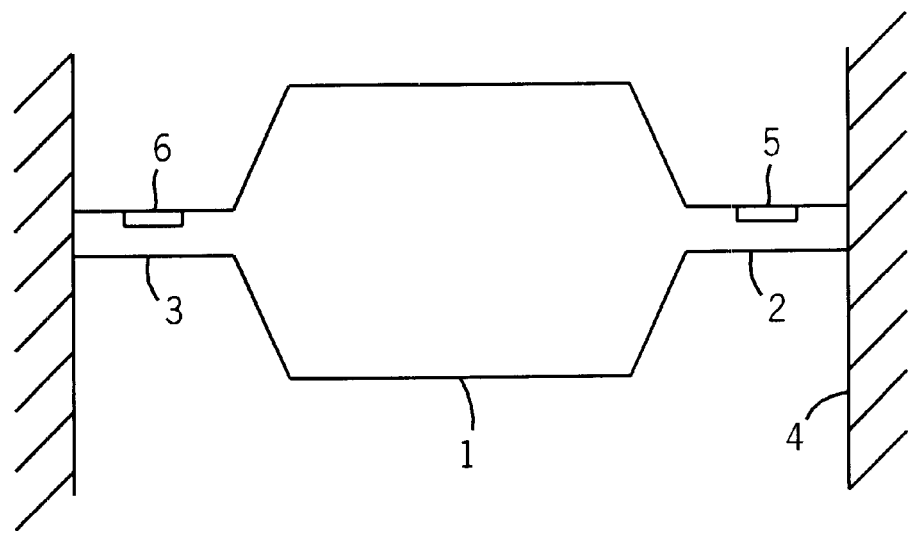
FIGS. 1a and 1b are a schematic side and plan views of a device according to the present invention.
Figure 1B:
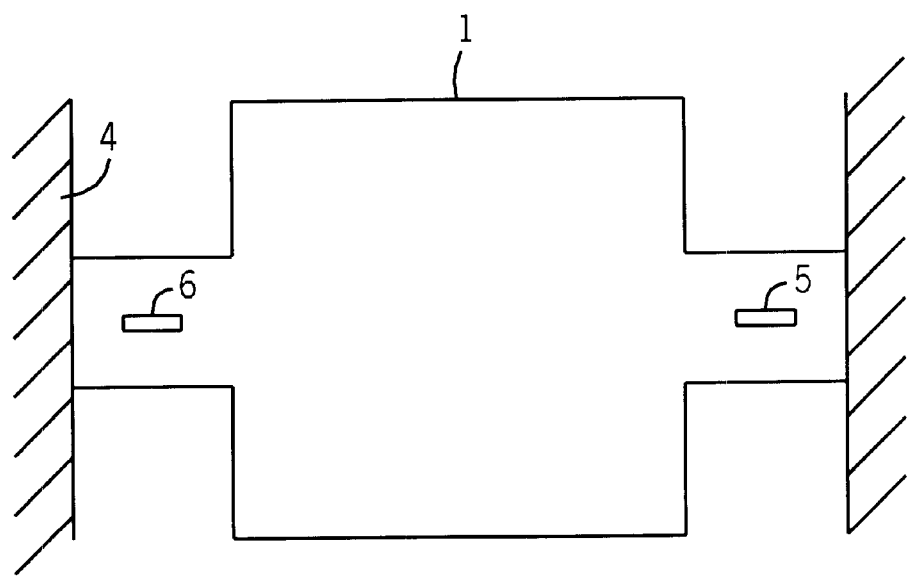

Referring to FIGS. 1a and 1b, an accelerometer according to the present invention has a mass 1 suspended on parallel beams 2, 3 from a support frame 4. In this example, all of the components are manufactured from a single semiconductor substrate which is preferably silicon.

One of the beams 2 has resistive elements 5 connected thereto. The other beam 3 has piezoresistive detector elements 6 formed to create a Wheatstone bridge. It will be appreciated that other positions for the excitation elements 5 and detection elements 6 are possible.

Figure 4:
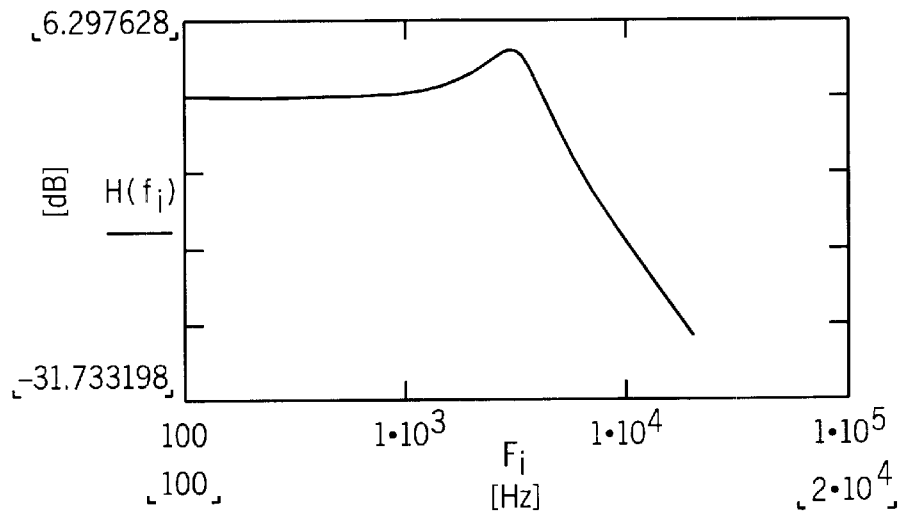
FIG. 4 is a graph showing variations in output of the devices of FIGS. 1 to 3 with respect to applied accelerative force.

In use, an alternating current is applied to the excitation elements 5, which heat the support member 2 and vibrate the support member 2, and hence the mass 1 and other support member 3. The vibration of this system generates a signal in the detection elements 6 and the vibration frequency can be controlled in a closed loop manner to continuously vibrate the mass 1 and beams 2, 3 at a resonant frequency the value of which is indicative of the correct operability of the device. Application of accelerative or decelerative forces to the mass in the Z-direction deforms the mass/beam structure and is detected. This deformation (second order vibration system) has linear response at the fundamental frequency (FIG. 4).

Figure 2:
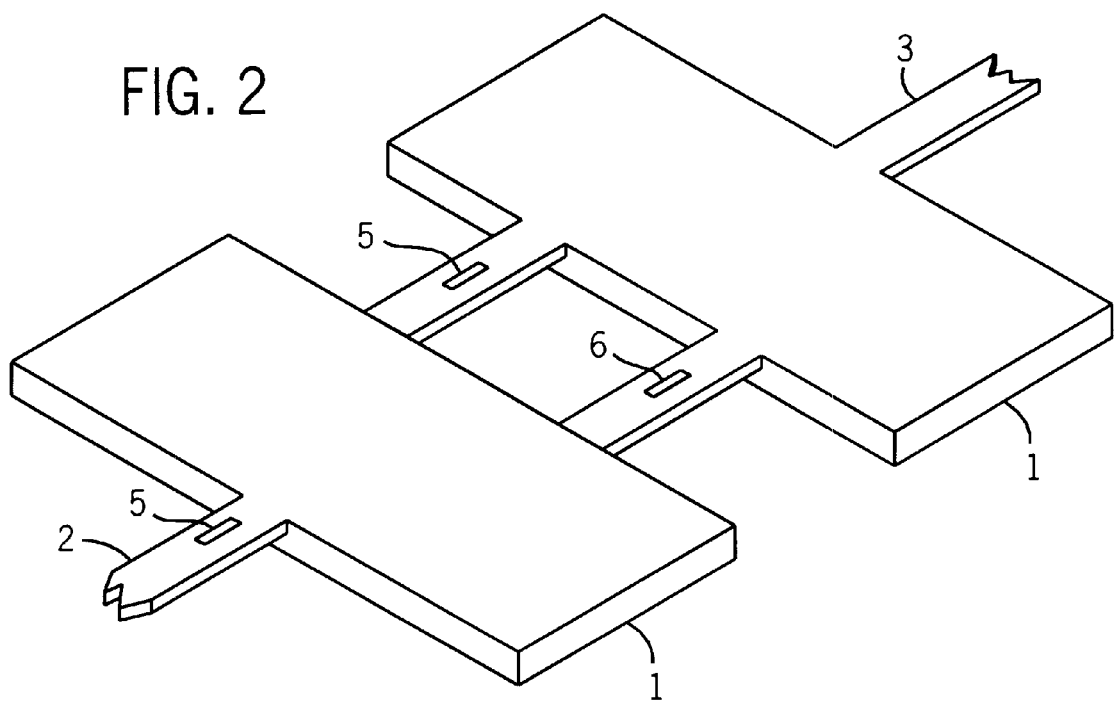
FIG. 2 is a perspective plan view of a second example device according to the invention.
Figure 3:
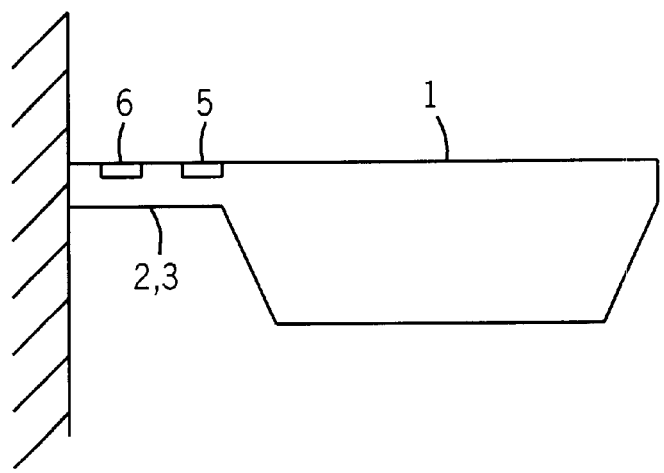
FIG. 3 is a side cross-sectional view of a third example device according to the invention.

FIGS. 2 and 3 show alternative mass/beam configurations that are also possible with the invention. FIG. 2 shows an arrangement in which there are two separate masses supported by appropriate beams, again with appropriate excitation and detection devices. FIG. 3 is a side cross-sectional view of a configuration in which the mass has a single support beam again, with corresponding components numbered identically.

Figure 5:
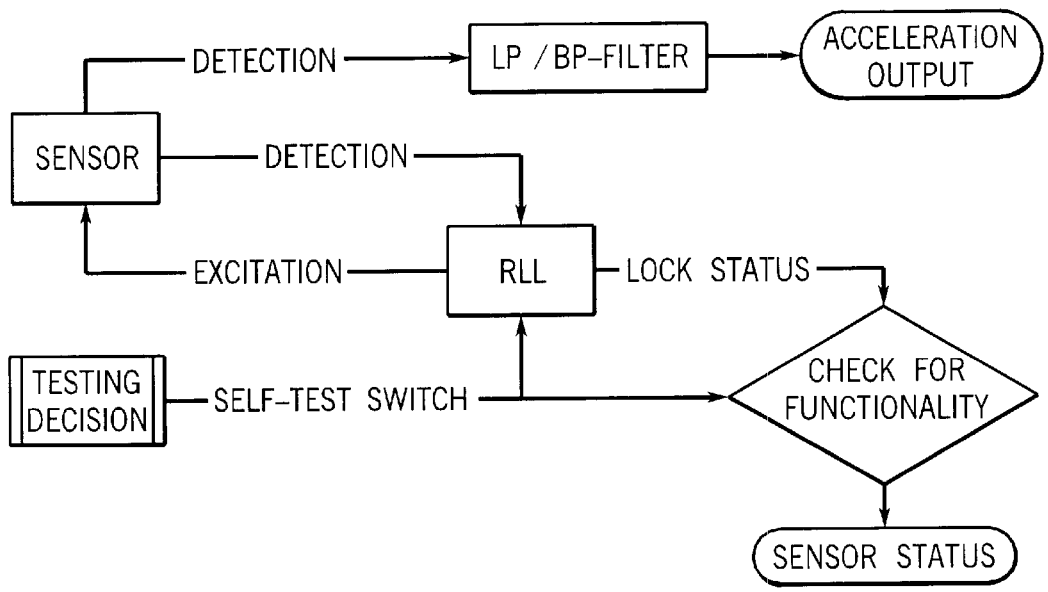
FIG. 5 is a circuit diagram showing example circuitry for employment with the device of FIGS. 1 and 2.

The circuitry of FIG. 5 provides an output indicative of the change in signal (similar to that shown in FIG. 4) in devices of the type shown in FIGS. 1 to 3 and hence indicative of the acceleration/deceleration applied to the device. In order to provide a linear response in this example the parameter sensing signal is central around the 1×104 Hz range.

Figure 6:
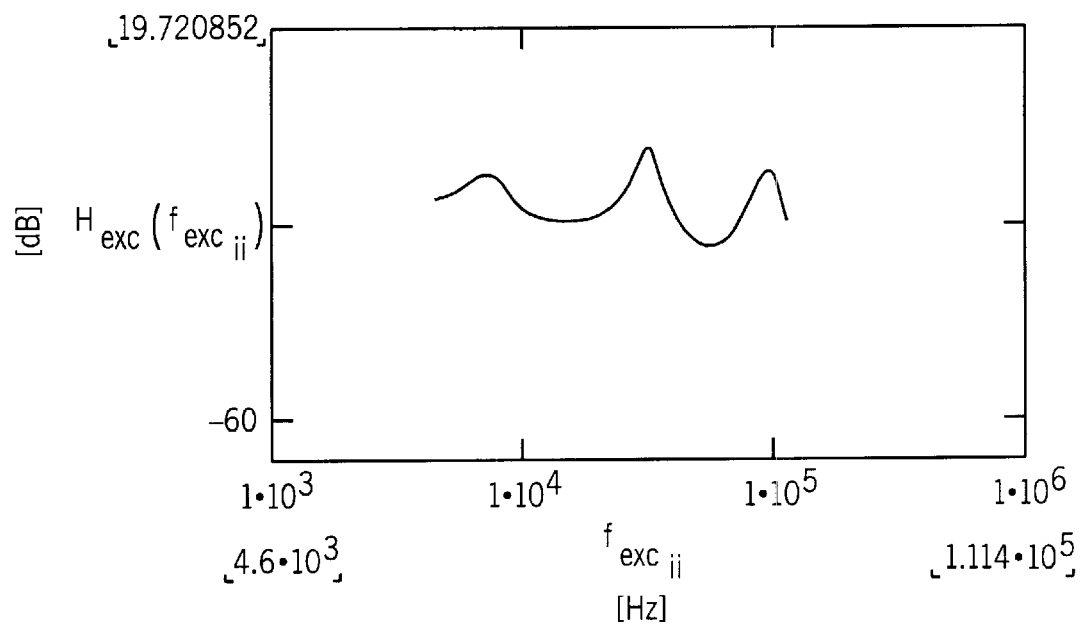
FIG. 6 is a graph of open loop response for an example device or the output of the circuitry of FIG. 3.

As will be described below with reference to FIG. 6, the device of the invention has a varying response to excitation frequency, with several peaks. As mentioned above, in this example a sensing signal frequency is generally located in this case in the region of 1×104 Hz. This enables the device to be excited at a resonant frequency for example in the region of 1×105 Hz without effecting the sensing signal, but in a manner which can be employed to determine the functionality of the device either on a continuous or intermittent basis.

Figure 7:
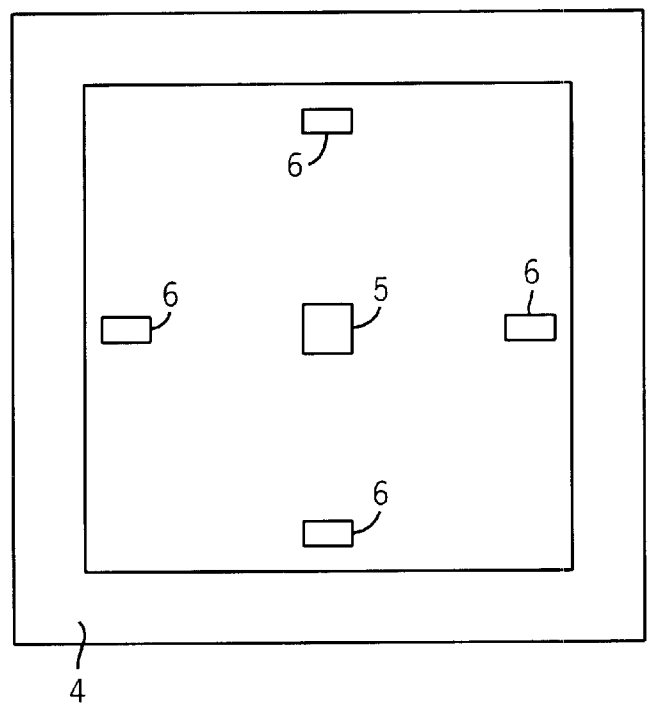
FIG. 7 is a plan view of a further example device according to the invention.

FIG. 7 shows a plan view of a pressure detector in which components corresponding to those of the previous examples of accelerometers are numbered identically. In this case, instead of a beam and mass arrangement a central membrane (which may be formed from the same semiconductor material as the support frame 4) has excitation elements 5 and detecting elements 6 formed thereon. Again, excitation of the sensing element of the device 1 (in this case the membrane) can be performed by thermal excitation of vibration modes by using.one or more resistors 5 (in this example 1 in the center). The detecting elements 6 provide outputs to a circuit of the type shown in FIG. 5 so that resonant frequency vibration in the first mode can be employed to provide a self-test signal, whilst the output at a differing frequency rate can be employed to provide a sensing signal based upon displacement of the membrane due to changes in pressure in the gas in which the detector is placed.

What is claimed is:

1. A sensor device formed from a semiconductor material, the device comprising:
    a support frame;
    a sensing element;
    means for vibrating the sensing element at a frequency corresponding generally to a first resonant frequency vibration mode, wherein the first resonant frequency vibration mode is indicative of the correct operability of the sensor device;
    error detection means for detecting actual frequency of vibration of the sensing element at the first resonant frequency vibration mode, wherein the error detection means provides an output in the form of an error detection signal indicative of the existence or otherwise of an expected response of the sensing element to vibration at the first resonant frequency vibration mode to provide an indication as to correct operability of the sensor device; and
    means for detecting the deformation of the sensing element to provide an output in the form of a sensing signal indicative of the parameter to be sensed, the deformation detecting means and error detection means being formed from the same elements, wherein the means for detecting the deformation of the sensing element are the same as the means for vibrating the sensing element and can electronically detect both the error detection signal as well as the sensing signal.

2. A sensor according to claim 1, wherein the vibrating means is one or more resistive element.

3. A sensor according to claim 1, wherein the error detection means is one or more piezoresistors.

4. A sensor according to claim 1, wherein the semiconductor is silicon.

5. A sensor according to claim 1, wherein the support frame and sensing element are formed from a single semiconductor substrate.

6. A sensor according to claim 1, arranged to operate as an accelerometer wherein the sensing element comprises at least one support beam and at least one mass.

7. A sensor according to claim 6, wherein the vibrating means is positioned on the at least one support beam.

8. A sensor according to claim 6, wherein the error detection means is provided by one or more piezoresistors, wherein the piezoresistors are positioned on the one or more support beams.

9. A sensor according to claim 1, arranged to operate as a pressure sensor, wherein the sensing element is a membrane.

10. A sensor according to claim 1, arranged to operate as a flow sensor.

* * * * *